US006870654B2

United States Patent
Lin et al.

(10) Patent No.: US 6,870,654 B2
(45) Date of Patent: Mar. 22, 2005

(54) STRUCTURE OF A STRUCTURE RELEASE AND A METHOD FOR MANUFACTURING THE SAME

(75) Inventors: Wen-Jian Lin, Hsinchu (TW); Hsiung-Kuang Tsai, Taipei (TW)

(73) Assignee: Prime View International Co., Ltd. (TW)

( * ) Notice: Subject to any disclaimer, the term of this patent is extended or adjusted under 35 U.S.C. 154(b) by 0 days.

(21) Appl. No.: 10/725,585

(22) Filed: Dec. 3, 2003

(65) Prior Publication Data

US 2004/0240027 A1 Dec. 2, 2004

(30) Foreign Application Priority Data

May 26, 2003 (TW) .......................... 92114190 A

(51) Int. Cl.$^7$ .................. G02F 1/03; H01L 21/8242
(52) U.S. Cl. .................. 359/245; 359/246; 359/254; 359/290; 359/291; 438/253; 438/396
(58) Field of Search .................. 359/245, 246, 359/247, 248, 254, 259, 265, 266, 269, 290, 291; 438/253, 396

(56) References Cited

U.S. PATENT DOCUMENTS

| 5,835,255 A | 11/1998 | Miles .......................... 359/291 |
| 6,812,480 B2 * | 11/2004 | Lee et al. ...................... 257/10 |
| 2003/0232203 A1 * | 12/2003 | Mutlu et al. ................. 428/451 |

* cited by examiner

Primary Examiner—Timothy Thompson
(74) Attorney, Agent, or Firm—Baker & Hostetler LLP

(57) ABSTRACT

A structure of a structure release and a manufacturing method are provided. The structure and manufacturing method are adapted for an interference display cell. The structure of the interference display cell includes a first electrode, a second electrode and at least one supporter. The second electrode has at least one hole and is arranged about parallel with the first electrode. The supporter is located between the first electrode and the second electrode and a cavity is formed. In the release etch process of manufacturing the structure, an etchant can pass through the hole to etch a sacrificial layer between the first and the second electrodes to form the cavity; therefore, the time needed for the process becomes shorter.

17 Claims, 5 Drawing Sheets

STRUCTURE OF A STRUCTURE RELEASE AND A METHOD FOR MANUFACTURING THE SAME

FIELD OF INVENTION

The present invention relates to a structure of a structure release and a method for manufacturing the same, and more particularly, the present invention relates to a structure of a structure release and a method for manufacturing the same adapted for an interference display cell.

BACKGROUND OF THE INVENTION

In a micro electro mechanical system (MEMS), the development of a sacrificial layer technique has become a key factor for manufacturing a suspended structure, such as a cantilever, a beam, a membrane, a channel, a cavity, a joint or hinge, a link, a crank, a gear or a rack, to name a few. A structure release etching process is adapted for removing a sacrificial layer, so a structure of a structure release in a micro electro mechanical system has a critical influence on the process of removing the sacrificial layer.

A conventional structure release etching process is first introduced with an interference display cell as an example. The interference display cell, a kind of a micro electro mechanical system, is used to fabricate a planar display. Planar displays have great superiority in the portable display device and limited-space display market because they are lightweight and small. To date, in addition to liquid crystal displays (LCD), organic electro-luminescent displays (OLED), and plasma display panels (PDP), a mode of optical interference displays is another option for planar displays.

U.S. Pat. No. 5,835,255 discloses an array of display cells of visible light that can be used in a planar display. Referring to FIG. 1, FIG. 1 illustrates a cross-sectional view of a conventional display cell.

Every optical interference display cell 100 comprises two walls, wall 102 and wall 104. The wall 102 and the wall 104 are supported by supporters 106, and a cavity 108 is subsequently formed between the wall 102, the wall 104 and the supporters 106. The distance between the wall 102 and the wall 104, that is, the length of the cavity 108, is D. Either the wall 102 or the wall 104 is a semi-transmissible/semi-reflective layer with an absorption rate that partially absorbs visible light, and the other is a light reflective layer that is deformable when voltage is applied. When the incident light passes through the wall 102 or the wall 104 and into the cavity 108, in wavelengths ($\lambda$) of all visible light spectra of the incident light, only visible light with a wavelength $\lambda_1$ corresponding to formula 1.1 can generate a constructive interference and can be emitted, that is, $$2D = N\lambda \qquad (1.1)$$

where N is a natural number.

When the length D of the cavity 108 is equal to half of the wavelength multiplied by any natural number, a constructive interference is generated and a sharp light wave is emitted. In the meantime, if an observer follows the direction of the incident light, a reflected light with wavelength $\lambda_1$ can be observed. Therefore, the optical interference display cell 100 is "open".

FIG. 2 illustrates a cross-sectional view of a conventional display cell after a voltage is applied. Referring to FIG. 2, while driven by the voltage, the wall 104 is deformed and falls down towards the wall 102 due to the attraction of static electricity. At this time, the distance between the wall 102 and the wall 104, that is, the length of the cavity 108, is not exactly equal to zero, but is d, which can be equal to zero. If D in formula 1.1 is replaced with d, only visible light with a wavelength $\lambda_2$ satisfying formula 1.1 in wavelengths $\lambda$ of all visible light spectra of the incident light can generate a constructive interference, be reflected by the wall 104, and pass through the wall 102. Because the wall 102 has a high light absorption rate for light with wavelength $\lambda_2$, all the incident light in the visible light spectrum is filtered out and an observer who follows the direction of the incident light cannot observe any reflected light in the visible light spectrum. Therefore, the optical interference display cell 100 is now "closed".

FIG. 3A and FIG. 3B illustrate a method for manufacturing a conventional display cell. Referring to FIG. 3A, a first electrode 110 and a sacrificial layer 111 are formed in sequence on a transparent substrate 109, and opening 112, which is suitable for forming a supporter therein, is formed in the first electrode 110 and the sacrificial layer 111. Then, a supporter 106 is formed in the opening 112. Next, an electrode 114 is formed on the sacrificial layer 111 and the supporter 106. Subsequently, referring to FIG. 3B, the sacrificial layer 111 shown in FIG. 3A is removed by a release etching process to form a cavity 116, which is located in the position of the sacrificial layer 111, and the length D of the cavity 116 is the thickness of the sacrificial layer 111.

In a micro electro mechanical process, a micro suspended structure is fabricated by use a sacrificial layer. A suspended movable microstructure is fabricated by a selective etching between a device structure layer and the sacrificial layer to remove the sacrificial layer and leave the structure layer, and this process is called a structure release etching. The difference between the structure release etching process and an IC process is that in the structure release etching process, the selective etching is an isotropic etching, so that an undercut or an under etching is formed in the structure layer for smooth separation of the structure layer and the substrate.

The most popular structure release etching process is a wet structure release process. In the wet structure release process, a rinsing step and a drying step usually have to be performed after etching, and a microstructure can substantially be suspended above the substrate. However, during the wet structure release process, it is quite easy for the structure and the substrate to stick together, thereby resulting in failure of the device. A dry etching process using xenon difluoride ($XeF_2$) as an etchant can be used to solve the problems resulted in the wet etching process.

Xenon difluoride is in a solid state at normal temperature and normal pressure, and is sublimated into the gaseous state at low pressure. Xenon difluoride has great etching selectivity on silicon materials, such as monocrystalline silicon, polysilicon and amorphous silicon, and some metals, such as molybdenum (Mo), molybdenum alloy and so on. Xenon is an inert gases, and xenon difluoride is quite unstable. The etching mechanism of xenon difluoride is that two fluorine free radicals are brought to the reaction positions by xenon, and when xenon difluoride contacts the material to be etched, xenon difluoride decomposes to release these two fluorine free radicals. Because the isotropic etching effect of xenon difluoride is great, xenon difluoride has an excellent capacity for lateral etching. In a micro electro mechanical system process, xenon difluoride is used as an etchant to remove a sacrificial layer in a structure release etching process.

Referring to FIG. 4, FIG. 4 illustrates a top view of a conventional optical interference display cell. The optical interference display cell 200 includes separation structures 202, such as defined by dotted lines 2021, located on two opposite sides of the optical interference display cell 200, and supporters 204 located on the other two opposite sides of the optical interference display cell 200. The separation structures 202 and the supporters 204 are located between two electrodes. There are gaps between the supporters 204, and the supporters 204 and the separation structures 202. The gaseous xenon difluoride permeates through the gaps and etches a sacrificial layer (not shown in FIG. 4). The rate of a structure release etching process with an etchant of the gaseous xenon difluoride changes with the different materials of the sacrificial layers desired to be etched. Typically, the etching rate can be greater than 10 micrometers per minute, and even can be up to 20–30 micrometers per minute for some materials. For the size of the present optical interference display cell, one structure release etching process only takes dozens of seconds to 3 minutes.

Although the structure release etching process performed with the etchant of gaseous xenon difluoride has the aforementioned advantages, a disadvantage of the high cost of the structure release etching process results from the character of xenon difluoride itself. Xenon difluoride is expensive, and is particularly sensitive to moisture and is unstable. When xenon difluoride contacts moisture, hydrogen fluoride is produced. Hydrogen fluoride is not only dangerous, but also reduces efficiency of etching. Besides, the structure release etching process performed using xenon difluoride as an etchant is rare in semiconductor processes and typical planar display processes, so etchers that are maturely developed in the semiconductor processes and the liquid crystal display processes are unsuitable for the structure release etching process with xenon difluoride etchant. The process apparatuses used in semiconductor or typical planar display can be continuously used in most of the main processes of the optical interference display, but the structure release etching process needs a totally different apparatus design. To reorganize and consolidate the process apparatuses would be an obstacle to the development and throughput of the optical interference display.

SUMMARY OF THE INVENTION

The development of the etching apparatus with an etchant of xenon difluoride is not maturing, which is disadvantageous to the development and throughput of the optical interference display, and the etchant xenon difluoride is expensive and unstable. Therefore, if etching process apparatuses used in semiconductor or typical planar display can be applied to perform a structure release etching process, the process apparatuses of the optical interference display are easily reorganized and consolidated, and the structure release etching process can be performed cheaply.

The reason that the etching apparatus used in typical semiconductor or planar display is not suitable for use in the structure release etching process is the poor capacity for lateral etching, and even though an etchant with a great etching property, for example, nitrogen trifluoride ($NF_3$) or sulphur hexafluoride ($SF_6$), is used, the etching rate is only between 3 micrometers and 10 micrometers per minute. This is slower than that for using xenon difluoride as an etchant by several to dozens of times. Therefore, this is very disadvantageous to throughput of the optical interference display.

Therefore, an objective of the present invention is to provide a structure of a structure release suitable for an optical interference display cell structure. Time needed for the structure etching process can be greatly reduced and throughput of the optical interference display can be increased.

Another objective of the present invention is to provide a structure of a structure release suitable for an optical interference display cell structure, in which a xenon difluoride process is not needed to perform a structure release etching, thereby avoiding the difficulties resulting from reorganizing and consolidating the process apparatuses.

Still another objective of the present invention is to provide a structure release etching process for a structure of a structure release suitable for an optical interference display cell structure. In the structure release etching process, an etching reagent including a fluorine base or a chlorine base, such as $CF_4$, $BCl_3$, $NF_3$, or $SF_6$ and so on, can be used to replace xenon difluoride to perform the structure release etching, thereby lowering producing cost.

Yet another objective of the present invention is to provide a structure release etching process for a structure of a structure release suitable for an optical interference display cell structure. The structure release etching process can use a conventional etching apparatus, so the difficulties resulting from reorganizing and consolidating the process apparatuses can be avoided.

According to the aforementioned objectives of the present invention, one preferred embodiment of the present invention takes an optical interference display as an example to illustrate how to apply the present invention to a micro electro mechanical system. An optical interference display cell structure includes a first electrode and a second electrode, the two electrodes being supported by a supporter, which is located between the two electrodes. A plurality of holes are located on the second electrode, and the holes pass through the second electrode and expose a sacrificial layer under the second electrode. With the holes in the second electrode, etching plasma can etch the exposed sacrificial layer through the holes, so as to accelerate a structure release etching process. Therefore, the etching process using an etchant including a fluorine base or a chlorine base, such as $CF_4$, $BCl_3$, $NF_3$, or $SF_6$ and so on, suitable for conventional semiconductor or typical planar display process can be used to perform a structure release etching process of the optical interference display cell, and process time of the structure release etching process is commensurate with that of xenon difluoride process. Certainly, the etching reagents including a fluorine base or a chlorine base can be adapted and mixed to form an etchant for etching the sacrificial layer.

In addition, the present invention preferably uses remote plasma. A plasma is first produced in a plasma generator, and after portion or all of the charged composition in the plasma is filtered out, the remaining plasma, the remote plasma, is sent into a chamber to perform a reaction. Free radicals are the main composition of the remote plasma, so a life cycle of the remote plasma is longer and the structure release etching of the sacrificial layer is performed efficiently. Besides, the free radicals are not charged and not easily affected by an electric field, so the effect of isotropic etching is better for being beneficial to lateral etching.

According to the optical interference display cell structure and the method for manufacturing the same of the present invention, the holes in the second electrode can indeed reduce the time taken in the structure release etching, to make it possible for a conventional etching process to replace a xenon difluoride etching process, and to avoid the difficulties resulting from reorganizing and consolidating the process apparatuses. The use of the remote plasma increases the lift cycle of the etching plasma and the lateral etching capacity of the plasma, accelerates the rate of the structure release etching, decrease the time needed in the structure release etching, and increases the throughput of the optical interference display.

BRIEF DESCRIPTION OF THE DRAWINGS

These and other features, aspects, and advantages of the present invention will be more fully understood by reading the following detailed description of the preferred embodiment, with reference made to the accompanying drawings as follows.

DETAILED DESCRIPTION OF THE PREFERRED EMBODIMENT

In order to make the illustration of a structure of a structure release and a method for manufacturing the same provided in the present invention more clear, an embodiment of the present invention herein takes an optical interference display cell structure and a manufacturing method thereof for example, to illustrate how to apply the structure of the structure release and the method for manufacturing the same disclosed in the present invention, and to further explain advantages of the present invention according to the disclosure of the embodiment.

Figure 5:
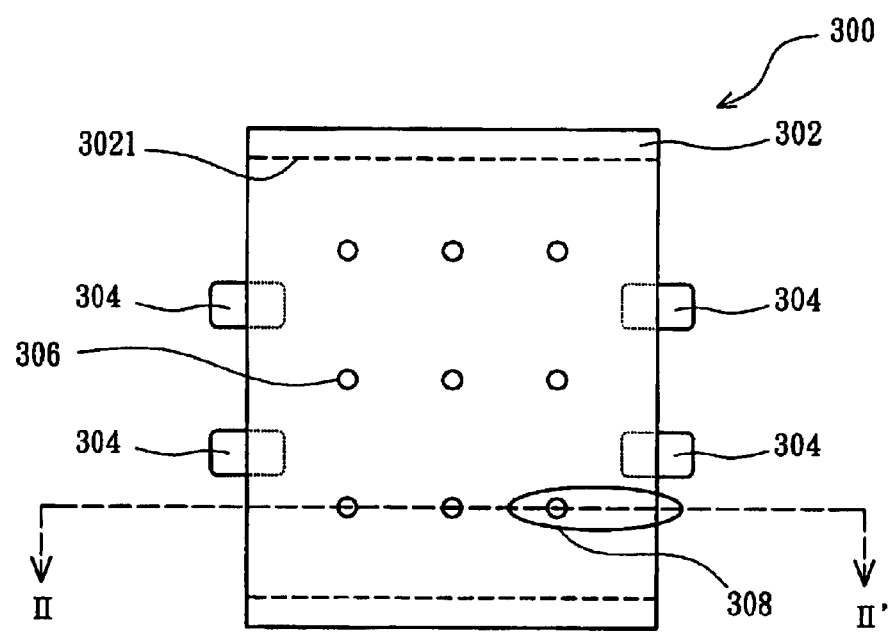
FIG. 5 illustrates a top view of an optical interference display cell in accordance with a preferred embodiment of the present invention.

FIG. 5 illustrates a top view of an optical interference display cell in accordance with a preferred embodiment of the present invention. Referring to FIG. 5, an optical interference display cell 300 includes an electrode 301, separation structures 302, such as defined by a dotted line 3021, and supporters 304. The separation structures 302 are located on two opposite sides of the optical interference display cell 300. The supporters 304 are located on another two opposite sides of the optical interference display cell 300, and the separation structures 302 and the supporters 304 are located between the electrode 301 and another electrode (not shown in FIG. 5). The electrode 301 includes at least one hole 306, which passes through the electrode 301. In order to enable remote plasma to diffuse efficiently into the hole 306, the diameter of the hole 306 is preferably not less than 1 micrometer. As the diameter of the hole 306 increases, the etching time decreases, but the larger hole 306 is not beneficial to the resolution of the optical interference display cell 300. Therefore, the diameter of the hole 306 is preferably not greater than 10 micrometers. In conclusion, a preferred diameter of the hole 306 is between about 1 micrometer and 5 micrometers. There are gaps between the supporters 304, and between each of the supporters 304 and the separation structures 302, and etching plasma can permeate through the gaps and the hole 306 and etch a sacrificial layer (not shown in FIG. 5).

Figure 1:
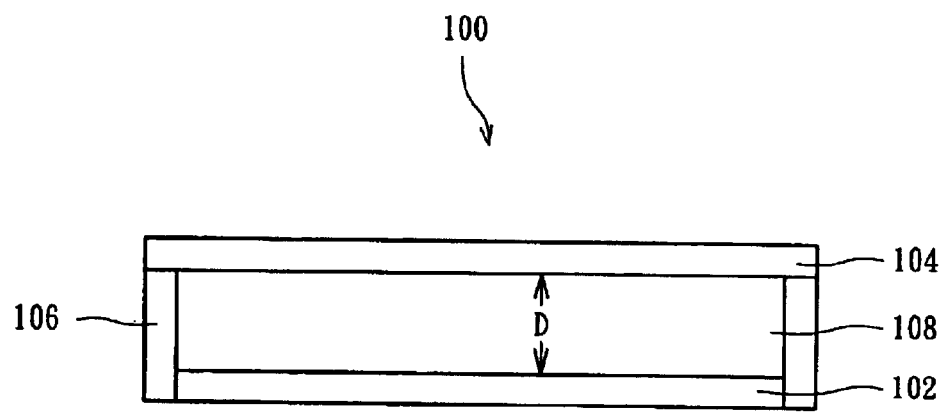
FIG. 1 illustrates a cross-sectional view of a conventional display cell.
Figure 2:
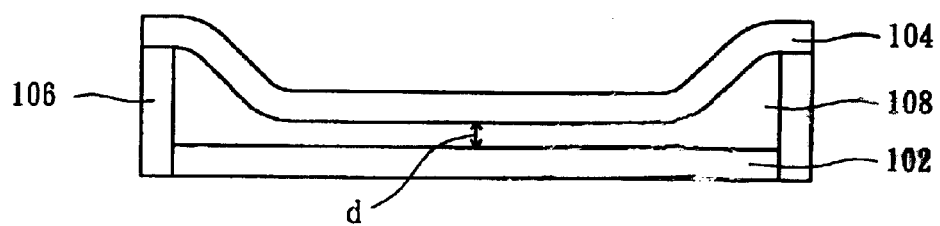
FIG. 2 illustrates a cross-sectional view of a conventional display cell after a voltage is applied.
Figure 3A:
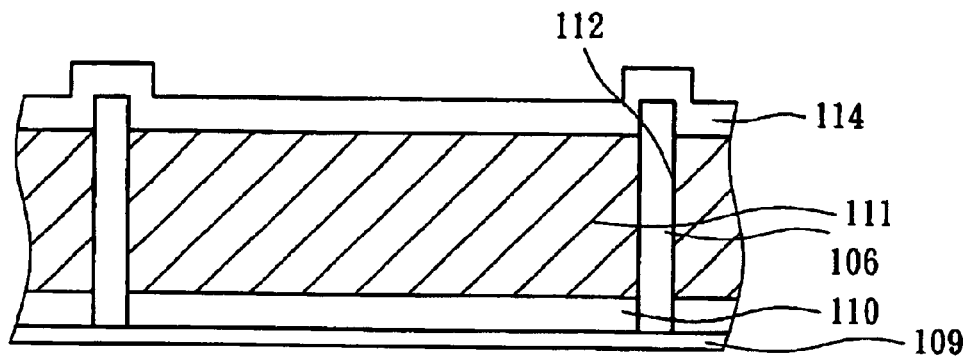
FIG. 3A and FIG. 3B illustrate a method for manufacturing a conventional display cell.
Figure 3B:
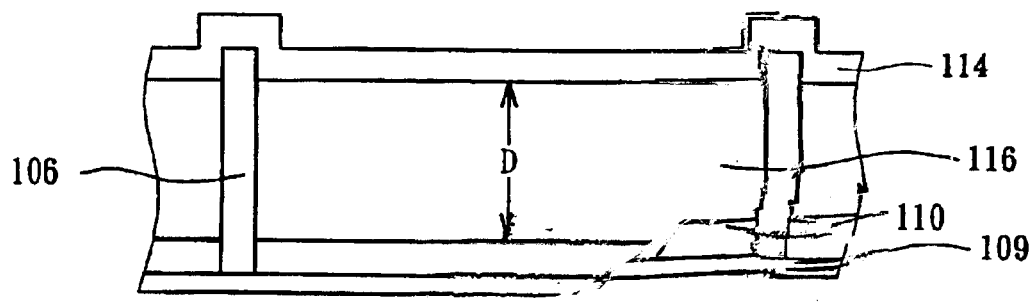
Figure 4:
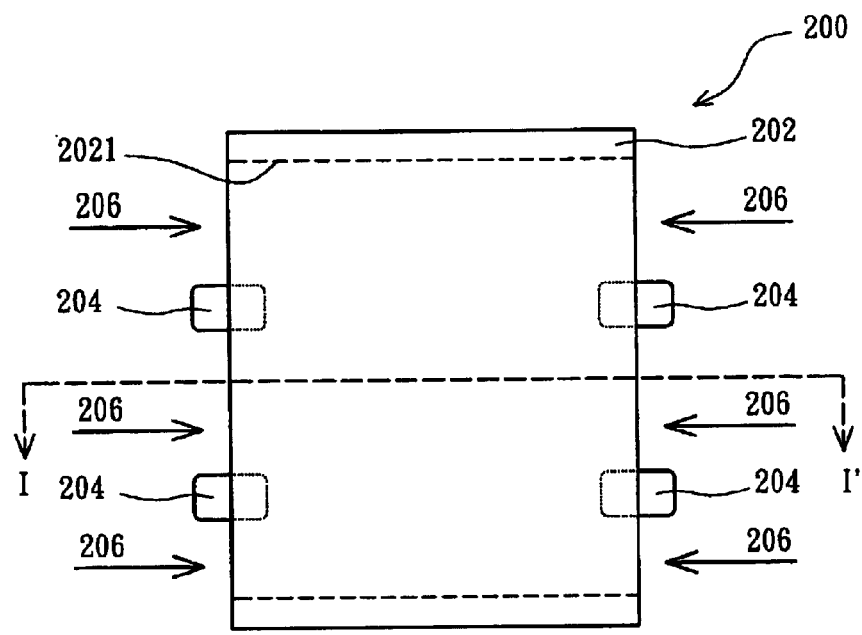
FIG. 4 illustrates a top view of a conventional optical interference display cell.
Figure 4A:
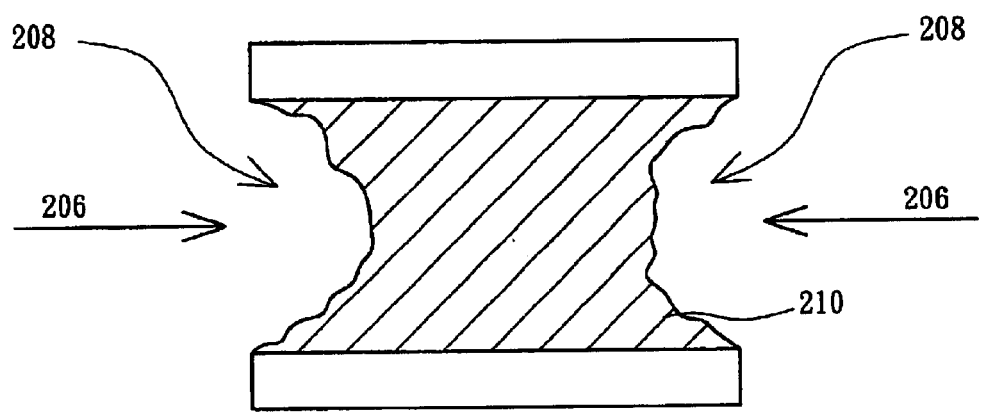
FIG. 4A illustrates a cross-sectional view of the structure shown in FIG. 4 along cross-sectional line I–I'.

In the present embodiment, the size of the optical interference display cell 300 is between about 50 micrometers and 100 micrometers. FIG. 4A illustrates a cross-sectional view of the structure shown in FIG. 4 along cross-sectional line I–I'. The gaseous xenon difluoride permeates through gaps 208 between the supporters (not shown in FIG. 4A), and between the supporters and the separation structures (not shown in FIG. 4A) to etch the sacrificial layer 210 toward the directions indicated by arrowheads 206. Typically, it takes about dozens of seconds to three minutes to finish a structure release etching process with gaseous xenon difluoride, although the etching rate of gaseous xenon difluoride varies with different materials of sacrificial layer to be etched. The conventional process, in contrast, takes about 10 minutes to 20 minutes, and sometimes even more than 20 minutes, to perform a structure release etching.

Figure 5A:
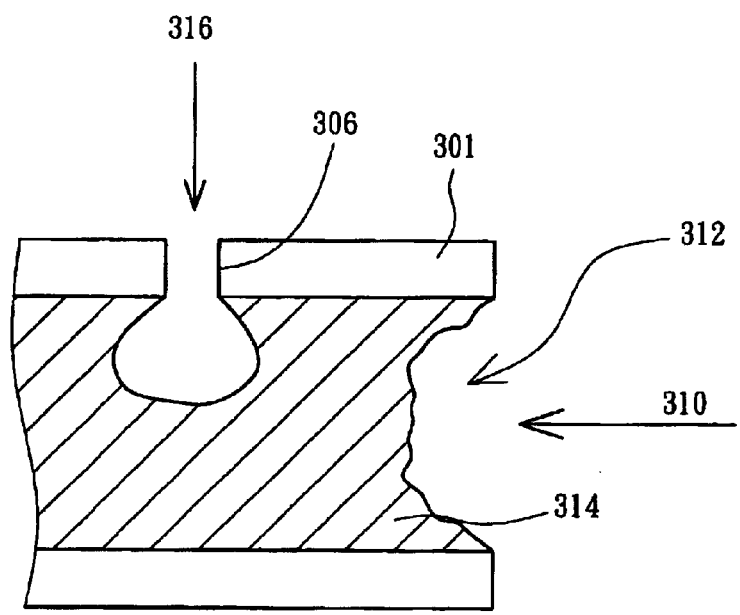
FIG. 5A illustrates an enlargement of a cross-sectional view of a circle 308 shown in FIG. 5 along cross-sectional line II–II'.

FIG. 5A illustrates an enlargement of a cross-sectional view of a circle 308 shown in FIG. 5 along cross-sectional line II–II'. Taking the optical interference display cell 300 illustrated in FIG. 5 as an example, when remote plasma produced from an etching reagent includes a fluorine base or a chlorine base, such as $CF_4$, $BCl_3$, $NF_3$, or $SF_6$, and is used to perform a structure release etching, the etching plasma not only permeates through gaps 312 between the supporters (not shown in FIG. 5A), and between the supporters and the separation structures (not shown in FIG. 5A) to etch the sacrificial layer 314 toward the direction indicated by an arrowhead 310, but also permeates through the hole 306 in the electrode 301 to etch the sacrificial layer 314 in the direction indicated by arrowhead 316. It takes less than 5 minutes to complete a structure release etching process, and typically, about 1 minute to 3 minutes are needed.

The optical interference display cell structure disclosed in the present invention enables the introduction of the conventional etching process, so the xenon difluoride etching process, which is expensive and not easy to reorganize and consolidate, is not needed, thereby avoiding the difficulties resulting from reorganizing and consolidating the process apparatuses.

Figure 6A:
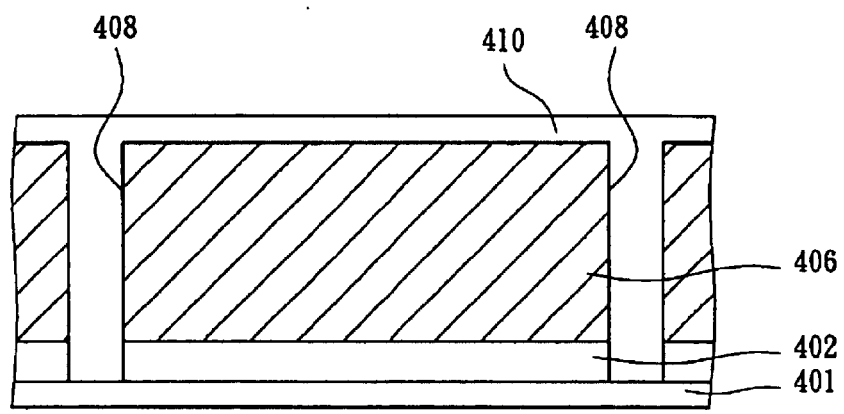
FIG. 6A to FIG. 6C illustrate a method for manufacturing an optical interference display cell structure in accordance with a preferred embodiment of the present invention.
Figure 6B:
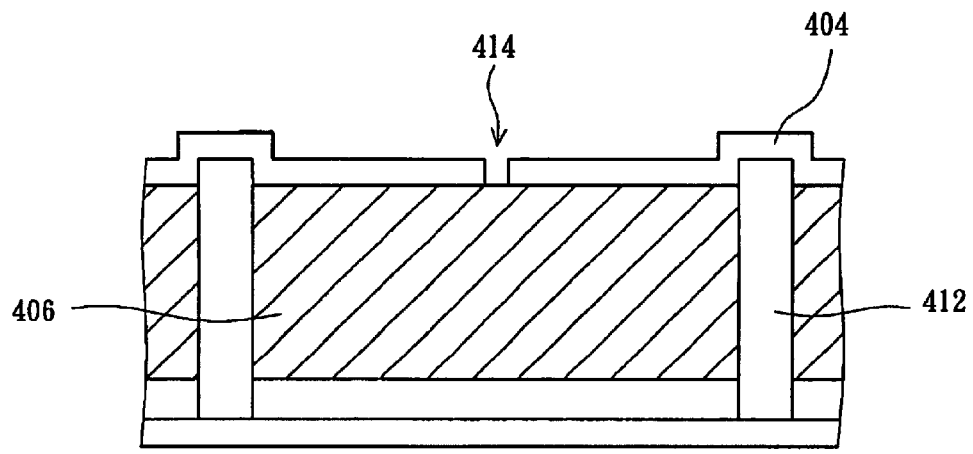
Figure 6C:
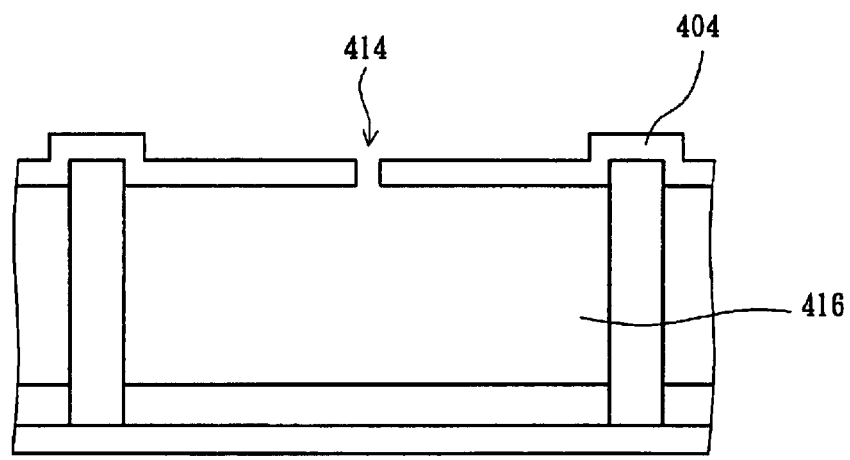

FIG. 6A to FIG. 6C illustrate a method for manufacturing an optical interference display cell structure in accordance with a preferred embodiment of the present invention. Referring to FIG. 6A, a first electrode 402 and a sacrificial layer 406 are firmed on a transparent substrate 401 in sequence. The material of the sacrificial layer 406 can be transparent material, such as dielectric material, or opaque material, such as metal material, polysilicon or amorphous silicon. In the embodiment, polysilicon is used as the material of the sacrificial layer 406. An opening 408 is formed in the first electrode 402 and the sacrificial layer 406 by a photolithography process, and the opening 408 is suitable for forming a supporter therein.

Then, a material layer 410 is formed on the sacrificial layer 406 to fill up the opening 408. The material layer 410 is suitable for forming the supporter, and the first material layer 410 generally is made of photosensitive materials such as photoresists, or a non-photosensitive polymer materials such as polyester, polyamide or the like. If non-photosensitive materials are used for forming the material layer 410, a photolithographic etching process is required to define supporters in the material layer 410. In this embodiment, the photosensitive materials are used for forming the material layer 410, so merely a photolithography process is required for patterning the material layer 410.

Referring to FIG. 6B, supporters 412 are defined by patterning the material layer 410 through a photolithography process. Next, a second electrode 404 is formed on the sacrificial layer 406 and the supporters 412. The second electrode 404 includes at least one hole 414.

Subsequently, remote plasma is produced by using an etching reagent including a fluorine base or a chlorine base, such as $CF_4$, $BCl_3$, $NF_3$, or $SF_6$ and so on, as a precursor to etch the sacrificial layer 406. The remote plasma etches the sacrificial layer 406 not only through the gaps (not shown in FIG. 6B) between the supporters, but also through the hole 414, so the sacrificial layer 406 is removed by a structure release etching process, and a cavity 416 such as illustrated in FIG. 6C is formed.

In the present invention, the materials suitable for forming the supporters 412 include positive photoresists, negative photoresists, and all kinds of polymers, such as acrylic resins and epoxy resins.

According to the optical interference display cell disclosed in the embodiment, at least one hole is formed in a deformable electrode, and the number of holes relates to the size of the optical interference display cell and the size of the hole. For example, if the size of the optical interference display cell is between about 50 micrometers and 100 micrometers, and the diameter of a hole is between 1 micrometer and 5 micrometers, 4 to 16 holes are needed to shorter time taken in a structure release etching process to an acceptable level. On the contrary, if the size of the optical interference display cell is less than 50 micrometers, the number of the holes may be less than 4, and even only one hole is needed to shorter time taken in a structure release etching process to an acceptable level.

The hole in the deformable electrode can substantially reduce time of a structure release etching process, so that etching processes suitable for semiconductor or planar display processes can be applied in the structure release etching process of the optical interference display cell structure, thereby avoiding the difficulties resulting from reorganizing and consolidating the xenon difluoride etching process apparatuses and the other deposition process apparatuses. Furthermore, fabrication cost can be reduced because the expensive xenon difluoride etching process is not needed.

As is understood by a person skilled in the art, the foregoing preferred embodiments of the present invention are illustrative of the present invention rather than limiting of the present invention. The structure of the structure release and the method for manufacturing the same disclosed in the present invention can be applied in various micro electro mechanical structure systems. It is intended that various modifications and similar arrangements be included within the spirit and scope of the appended claims, the scope of which should be accorded the broadest interpretation so as to encompass all such modifications and similar structure.

What is claimed is:

1. A structure of a structure release, suitable for an optical interference display cell structure, the structure of a structure release comprising:
    a first electrode;
    a second electrode including at least one hole, wherein the second electrode is arranged about parallel with the first electrode; and
    a supporter located between the first electrode and the second electrode, wherein a cavity is formed between the supporter, the first electrode and the second electrode,
    wherein when a structure release etching process is used to remove a sacrificial layer between the first electrode and the second electrode to form the cavity, an etchant passes through the hole to etch the sacrificial layer, so as to reduce the time needed in the structure release etching process.

2. The structure of a structure release according to claim 1, wherein a diameter of the hole is between about 1 micrometer and 10 micrometers.

3. The structure of a structure release according to claim 1, wherein a diameter of the hole is between about 1 micrometer and 5 micrometers.

4. The structure of a structure release according to claim 1, wherein the structure release etching process is a remote plasma etching process.

5. The structure of a structure release according to claim 4, wherein a precursor of a remote plasma formed in the remote plasma etching process is an etching reagent, and the etching reagent is selected from the group consisting of a fluorine base and a chlorine base.

6. The structure of a structure release according to claim 4, wherein a precursor of a remote plasma formed in the remote plasma etching process is selected from the group consisting of $CF_4$, $BCl_3$, $NF_3$, $SF_6$ and any combination thereof.

7. The structure of a structure release according to claim 1, wherein the etchant includes an etching reagent, and the etching reagent is selected from the group consisting of a fluorine base and a chlorine base.

8. The structure of a structure release according to claim 1, wherein the etchant is selected from the group consisting of $CF_4$, $BCl_3$, $NF_3$, $SF_6$ and any combination thereof.

9. The structure of a structure release according to claim 1, wherein a material of the sacrificial layer is selected from the group consisting of dielectric material, metal material and silicon material.

10. The structure of a structure release according to claim 1, wherein the second electrode is a deformable electrode.

11. A method for manufacturing an optical interference display cell disposed on a substrate, the method for manufacturing an optical interference display cell comprising:
    forming a first electrode on the substrate;
    forming a sacrificial layer on the first electrode;
    forming at least two openings in the sacrificial layer and the first electrode to define a position of the optical interference display cell;
    forming a supporter in each of the openings;
    forming a second electrode on the sacrificial layer and the supporter in each of the openings, wherein the second electrode includes at least one hole, and the hole exposes the sacrificial layer; and
    removing the sacrificial layer by a remote plasma etching process.

12. The method for manufacturing an optical interference display cell according to claim 11, wherein the second electrode is a deformable electrode.

13. The method for manufacturing an optical interference display cell according to claim 11, wherein a diameter of the hole is between about 1 micrometer and 10 micrometers.

14. The method for manufacturing an optical interference display cell according to claim 11, wherein a diameter of the hole is between about 1 micrometer and 5 micrometers.

15. The method for manufacturing an optical interference display cell according to claim 11, wherein a precursor of a remote plasma formed in the remote plasma etching process is an etching reagent, and the etching reagent is selected from the group consisting of a fluorine base and a chlorine base.

16. The method for manufacturing an optical interference display cell according to claim 11, wherein a precursor of a remote plasma formed in the remote plasma etching process is selected from the group consisting of $CF_4$, $BCl_3$, $NF_3$, $SF_6$ and any combination thereof.

17. The method for manufacturing an optical interference display cell according to claim 11, wherein a material of the sacrificial layer is selected from the group consisting of dielectric material, metal material and silicon material.

* * * * *